March 8, 1949.　　　　V. J. CARCELLI　　　　2,464,070

SELF-CENTERING BORE GAUGE

Filed Oct. 15, 1946

INVENTOR.

VICTOR J. CARCELLI

BY *Victor J. Evans & Co.*

ATTORNEYS

Patented Mar. 8, 1949

2,464,070

UNITED STATES PATENT OFFICE 2,464,070

SELF-CENTERING BORE GAUGE

Victor J. Carcelli, South Gate, Calif.

Application October 15, 1946, Serial No. 703,353

6 Claims. (Cl. 33—178)

My present invention relates generally to improvements in geometrical instruments or gauges, and more specifically to an improved centering gauge of the type employing a series of radial gauge arms and designed especially as an instrument for finding the center of a finished interior bore in a casting to check the center or to lay out work, and ascertaining the center line of a hole, opening, or recess in a piece of tubular work.

The instrument is particularly adapted for use in machine shops for quickly and with accuracy, measuring and determining the interior dimensions of tubular work, and the primary object of the invention is the provision of a portable instrument of this type that is composed of a minimum number of parts that may with facility be manufactured at low cost of production, and readily assembled, to form a compact and effective gauge that may be manipulated with facility.

The invention consists essentially in certain novel combinations and arrangements of parts involving a set of radiating gauge-arms together with specific means for projecting and retracting the arms, as will hereinafter be described and more specifically set forth in the appended claims.

In the accompanying drawings I have illustrated one complete example of the physical embodiment of my invention, in which the parts are combined and arranged according to one mode I have devised for the practical application of the principles of my invention; but it will be understood that various changes are contemplated and may be made in these exemplifying drawings and mechanical structures within the scope of my claims, without departing from the principles of the invention.

Figure 1:
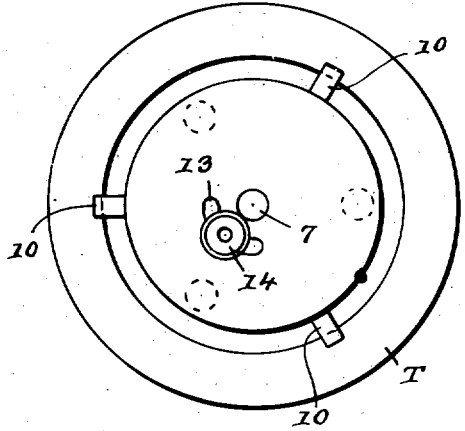
Figure 1 is an exterior view of a centering gauge in which my invention is embodied and applied to a tubular piece of work, with the gauge arms in projected position.
Figure 2:
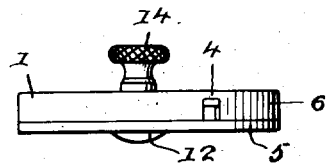
Figure 2 is an edge view of the centering gauge shown in Figure 1.

In Figure 1 the centering gauge is illustrated as applied to a cylindrical tube for inside measurement or testing, the gauge arms of the instrument being projected with the fingers at the outer ends of the arms in contact with the innerbore of the tube T. In the physical embodiment of the invention I employ a flat circular case including a base plate 1 having upon its inner an annular flange 2 forming an interior recess to accommodate operating parts, and the flange is provided with a series of circumferentially spaced radial channels or grooves 4, open at their outer and inner ends.

The base plate is equipped with a cover 5 which is fastened thereto by screws 6 threaded in the annular flange and the cover, together with the channels or grooves 4, forms radially extending slots in the case, here shown as three in number. While I have shown three slots to accommodate three gauge arms, it will be understood that the number of slots and arms for the instrument may be varied in accord with different sizes of the instrument.

Within the interior of the case and at its axial center a solid cylindrical rotor or spider-head 7 is journaled in complementary spaced openings in the base plate and cover, and this rotor or journaled head is provided with three integral crank arms 8 which project laterally into the open recess 33 of the base plate, and a complementary series of toggle links 9 at their inner ends are pivoted to the crank arms.

At their outer ends each of the toggle links is pivoted to a gauge arm 10 that is slidably mounted in one of the radial slots of the case, and each arm at its outer end terminates in an extension or angular flange 11 forming a contact finger for engagement with the work in measuring or testing operations.

Figure 3:
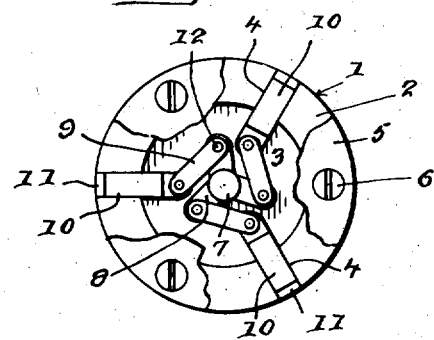
Figure 3 is a plan view of the gauge with the cover partly broken away to show the interior operating parts, and with the gauge arms retracted within the case or housing of the instrument.
Figure 4:
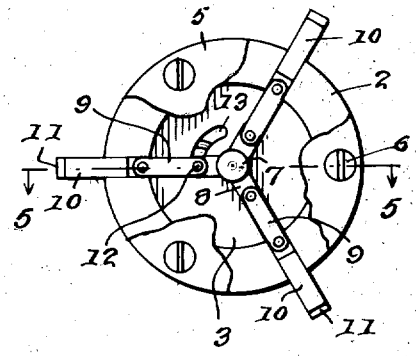
Figure 4 is a view similar to Figure 3, but with the gauge arms projected as in use.
Figure 5:
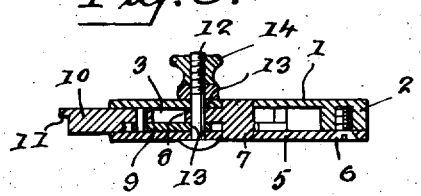
Figure 5 is a sectional detail view as at line 5—5 of Figure 4.

The compact arrangement of the crank arms and the links within the interior recess of the case provides for an unobstructed movement of these parts, as indicated in Figures 3 and 4, and the toggle arrangement insures a positive and precise action of the gauge arms as they are projected from the position of Figure 3, and retracted from the position of Figure 4 by turning movement of the rotor or spider-head.

For swinging or turning the rotor to project and retract the gauge arms, one of the toggle links is provided with a special pivot pin in the form of a headed screw 12, which passes through a pair of concentric arcuate slots 13, 13 of the base plate and of the cover, and an exterior clamping nut 14, which is threaded on the protruding end of the screw, is employed as a knob or handle for operating the gauge arms. In the drawings, the knob or nut is swung clockwise to retract the arms, and turned counter-clockwise to project the arms, and the nut may be utilized for clamping the gauge arms in adjusted position.

Figure 6:
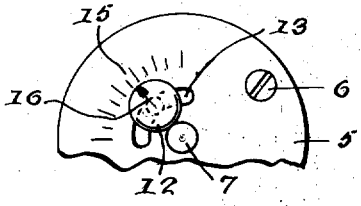
Figure 6 is an exterior detail view of part of the instrument, showing a circular scale on the case for use in pre-setting the gauge arms of the instrument.

As seen in Figure 6 the outer face of the base plate is provided with an arcuate scale 15 for graduated dimensions arranged concentrically with the slot 13, and the knob or nut 14 is provided with an indicating arrow 16 for pointing to the graduations, which may be used for presetting the gauge to accurately obtain correct sizes or dimensions of a hole to be measured.

Various changes and alterations may be made in this preferred form of the invention, for instance, be reversing the position of the flange or finger of the gauge arms, the instrument may be employed in laying out and checking work, and in finishing certain types of work on lathes in a machine shop.

Having thus fully described my invention, what I claim as new and desire to secure by Letters Patent is:

1. In a centering gauge, the combination with a case having a series of spaced radial slots and an arcuate slot, and a central rotor journaled in the case, of a series of gauge-arms slidable in the radial slots, links pivotally connecting the rotor with the inner ends of said arms, a stud-screw forming the pivot for one of said links and extending through the arcuate slot, and a clamp nut threaded on the free end of said screw.

2. In a centering gauge, the combination with a case having a series of spaced radial slots, an arcuate slot and a pre-setting scale on the exterior of the case, of a series of gauge-arms slidable in the radial slots, a central spider-head journaled in the case, toggle-links pivotally connecting the spider head with said arms, a stud screw forming the pivot for one of said links and extending through the arcuate slot, a clamp nut threaded on the free end of the stud screw, and an arrow on the nut for coaction with said scale.

3. In a centering gauge, the combination with a circular base plate, an annular flange on the base plate and spaced radial slots in said flange, a flanged cover for the base plate and screws for fastening said cover to the base plate, of a rotor centrally journaled within the case and crank arms on said rotor, a series of arms having gauge fingers and slidable in said slots, a series of links forming toggle connections between the gauge arms and the crank arms, a stud screw forming the pivot for one of said links and protruding through an arcuate slot of the case, and a clamp nut threaded on the free end of said screw.

4. The invention as in claim 1, wherein a flanged cover is provided for said case and means is also provided for fastening said cover to said case.

5. The invention as in claim 1 wherein contact fingers are provided on the ends of said gauge arms.

6. The invention as in claim 1 wherein means is provided for turning the rotor to project and retract the gauge arms.

VICTOR J. CARCELLI.

REFERENCES CITED

The following references are of record in the file of this patent:

UNITED STATES PATENTS

| Number | Name | Date |
|---|---|---|
| 811,695 | Casserly | Feb. 6, 1906 |

FOREIGN PATENTS

| Number | Country | Date |
|---|---|---|
| 63,898 | Germany | Aug. 10, 1892 |
| 632,109 | Germany | July 2, 1936 |